Patented June 17, 1952

2,600,818

UNITED STATES PATENT OFFICE 2,600,818

AIR-DRYING WRINKLE FINISH AND METHOD OF MAKING

William A. Waldie, Oakwood, Ohio, assignor to New Wrinkle, Inc., Wilmington, Del., a corporation of Delaware No Drawing. Application September 18, 1947, Serial No. 774,899

11 Claims. (Cl. 260—18)

This invention deals with a wrinkle coating composition and a process of manufacturing it.

In most of the wrinkle coating compositions used heretofore it has been necessary to subject the oil and sometimes also the final composition to a cooking process in order to obtain a wrinkle-textured surface. This cooking step not only prolongs the process of manufacture, but also increases the cost and requires additional care. Moreover, the coatings prepared from the compositions used heretofore have to be dried by forced means such as by heating in an oven by infra-red light or the like.

It is an object of this invention to provide wrinkle coating compositions for the preparation and application of which hardly any heating is required.

It is an object of this invention to provide wrinkle coating compositions which are air-drying.

It is an object of this invention to provide wrinkle coating compositions in which no heat is required for the blending step, since the mixing of the ingredients is carried out at room temperature.

It is another object of this invention to provide wrinkle coating compositions which dry to hard wrinkle-textured coatings at room temperature in a relatively short time.

It is still another object of this invention to provide wrinkle coating compositions which yield coatings having a great hardness and a long service life.

These and other objects are accomplished by cold-blending a non-wrinkling varnish with raw tung oil.

It was quite unexpected and surprising to find that by merely mixing these materials which per se are non-wrinkling, products are obtained which dry without any application of heat thereby forming coatings with a uniform wrinkle texture and of great hardness. A process for the production of wrinkle finishes has thus been devised by this invention which is characterized by great simplicity and low cost.

Quantities ranging from 1 gallon to 10 gallons of non-wrinkling varnish per 1 gallon of raw tung oil may be used. The higher the oil content, the more pronounced the wrinkling texture.

The varnishes used for the compositions of my invention comprise from 8 to 12 gallons of oiticica oil, 100 pounds of phenol formaldehyde resin, from 1 to 3 pounds of a hardening material such as litharge, red lead or the like, and from 12 to 20 gallons of thinner, such as xylol, toluol, solvent naphtha, high flash coal tar naphtha, hydrogenated naphtha, petroleum thinner or a mixture of any of such thinners. In preparing the varnishes the resin and the oil are first heated together to approximately 450° F.; thereafter the hardening substance is added and the mixture heated to a temperature ranging from 490° to 500° F. This temperature is held until a tough and hard pill is obtained on a glass plate, which takes about from 30 minutes to one hour. The mixture is then allowed to cool to 350° F. when the thinner is added. In spite of the use of oiticica oil, and in spite of the varnish being subjected to a cooking process, the final product obtained is of the non-wrinkling type.

If a colored coating is to be produced, the addition of a coloring paste is necessary. Such a paste preferably contains approximately equal amounts of filler and coloring matter together with a small quantity of non-wrinkling varnish and with thinner material which is preferably a highly volatile solvent.

The filler materials found particularly suitable are asbestine, silex, diatomaceous earth, blanc fixe, or mixtures of these or other known inorganic filler materials.

Coloring materials which have been found operative for the invention are the various grades of carbon black, chrome yellow, chrome green, iron pigments, titanium oxide, iron blues, organic toners and the like.

The coating composition may be applied to the article to be provided with a wrinkle-textured film by any method known in the art; brushing, immersing and spraying, for instance, are satisfactory. However, application by spraying is the preferred method.

In the following, a few examples for the new coating compositions are given as preferred embodiments of my invention. These examples are by no means limitative but are to serve merely as illustration.

EXAMPLE I (a) *Varnish*

A varnish was prepared by first heating a mixture of 100 pounds of rosin-modified phenol formaldehyde resin and 10 gallons of oiticica oil to approximately 450° F. and then adding under stirring 2 pounds of litharge. This mixture was then heated to 500° F. for about 45 minutes when a pill thereof applied to a glass plate and cooled showed a tough and hard consistency. Thereafter the batch was allowed to cool to approximately 350° F.; 5 gallons of xylol and 10 gallons of toluol were then added.

(b) Coloring paste 16 pounds of asbestine,
16 pounds of lamp black,
8 gallons of the varnish described under (a), and
4 gallons of mineral spirits were mixed and ground to a homogeneous paste.

(c) Wrinkle coating composition 122 pounds of the paste described under (b),
10 gallons of the varnish described under (a),
8 gallons of raw tung oil,
6 gallons of xylol,
2 gallons of butanol, and
0.5 gallon of a 6% solution of manganese naphthenate were blended at room temperature. A coating obtained with this mixture dried in 16 hours to form a hard film of black color and uniform wrinkle texture.

EXAMPLE II

(a) Varnish

The same varnish was used in this instance as described under (a) of Example I.

(b) Coloring paste

For the purpose of preparing a coating of white color, a paste was mixed and ground from 64 pounds of titanium oxide,
64 pounds of asbestine,
8 gallons of varnish as described under (a) of Example I, and
4 gallons of mineral spirits

(c) Wrinkle coating composition 12 pounds of the white paste set forth under (b) of Example II,
1.25 gallons of varnish,
1 gallon of raw tung oil,
0.75 gallon of xylol,
0.25 gallon of butanol, and
0.06 gallon of a 6% solution of manganese naphthenate were mixed at room temperature. A coating obtained with this composition dried after 21 hours and yielded a white coating of great hardness with a surface of a fine, uniform wrinkle texture.

EXAMPLE III

(a) Varnish

The same varnish was used in this instance as described under (a) of Example I.

(b) Coloring paste 16 pounds of asbestine,
16 pounds of lamp black,
4 gallons of varnish, and
4 gallons of mineral spirits were mixed and ground into a uniform paste.

(c) Wrinkle coating composition 9 pounds of the paste described under (b),
1.75 gallons of varnish,
1 gallon of raw tung oil,
0.75 gallon of xylol,
0.25 gallon of butanol, and
0.06 gallon of a 6% solution of manganese naphthenate were mixed at room temperature. The drying time of a coating obtained from this composition was 18 hours. The coating had a uniformly wrinkle-textured surface, was of black color and had a hard consistency.

EXAMPLE IV

(a) Varnish

The same varnish was used as described under (a) of Example I.

(b) Coloring paste

No coloring paste was used in this instance.

(c) Wrinkle coating composition 2 gallons of the varnish,
1 gallon of raw tung oil,
0.75 gallon of xylol,
0.25 gallon of butanol, and
0.125 gallon of a 6% solution of manganese naphthenate were mixed at room temperature. A coating prepared from this composition was dry and hard after 20 hours and showed a fine wrinkle texture.

EXAMPLE V

(a) Varnish

A varnish was prepared by the method described in Example I. The ingredients used in this instance, however, were as follows:

100 pounds of phenyl phenol formaldehyde resin
10 gallons of oiticica oil
2 pounds of red lead
5 gallons of xylol
10 gallons of toluol

(b) Coloring paste

No paste was used in this instance.

(c) Wrinkle coating composition 2.25 gallons of the varnish,
0.5 gallon of raw tung oil,
0.75 gallon of xylol,
0.25 gallon of butanol, and
0.06 gallon of a 6% solution of manganese naphthenate were mixed at room temperature. A coating was prepared from this composition; it dried after 16 hours. The hardness was satisfactory and the texture coarse and uniform.

EXAMPLE VI

(a) Varnish

The same varnish was used in this instance as described under (a) of Example I.

(b) Coloring paste 16 pounds of asbestine,
16 pounds of lamp black,
4 gallons of raw tung oil, and
5 gallons of mineral spirits were mixed and ground.

(c) Wrinkle coating composition 28 pounds of the paste described under (b),
9 gallons of the varnish,
1 gallon of raw tung oil,
3 gallons of xylol,
1 gallon of butanol, and
0.25 gallon of a 6% solution of manganese naphthenate were mixed at room temperature. The drying time of a coating prepared from this composition was 22 hours. The wrinkle texture was uniform and the hardness satisfactory.

It will be understood that while there have been described herein certain embodiments of my invention, it is not intended thereby to have the invention limited to the specific details given in view of the fact that it is susceptible to various modifications and changes which come within the spirit of the specification and the scope of the appended claims.

I claim:

1. A new air-drying wrinkling coating composition comprising a cold blend of 10 gallons of varnish, 122 pounds of a coloring paste, 8 gallons of raw tung oil, 6 gallons of xylol, 2 gallons of butanol and 0.5 gallon of a 6% solution of manganese naphthenate, said varnish consisting of a heat reaction product of 100 pounds of rosin-modified phenol formaldehyde resin, 10 gallons of oiticica oil, 2 pounds of litharge, 5 gallons of xylol and 10 gallons of toluol, and said coloring paste consisting of 16 pounds of asbestine, 16 pounds of lamp black, 8 gallons of said varnish and 4 gallons of mineral spirits.

2. A new air-drying wrinkling coating composition consisting of a cold mixture of 12 pounds of a coloring paste, 1.25 gallons of varnish, 1 gallon of raw tung oil, 0.75 gallon of xylol, 0.25 gallon of butanol and 0.06 gallon of a 6% solution of manganese naphthenate, said varnish consisting of a heat reaction product of 100 pounds of rosin-modified phenol formaldehyde resin, 10 gallons of oiticica oil, 2 pounds of litharge, 5 gallons of xylol and 10 gallons of toluol, and said coloring paste consisting of 64 pounds of titanium oxide, 64 pounds of asbestine, 8 gallons of said varnish, and 4 gallons of mineral spirits.

3. A new air-drying wrinkling coating composition consisting of 9 pounds of coloring paste, 1.75 gallons of varnish, 1 gallon of raw tung oil, 0.75 gallon of xylol, 0.25 gallon of butanol and 0.06 gallon of a 6% solution of manganese naphthenate, said varnish consisting of a heat reaction product of 100 pounds of rosin-modified phenol formaldehyde resin, 10 gallons of oiticica oil, 2 pounds of litharge, 5 gallons of xylol and 10 gallons of toluol, and said coloring paste consisting of 16 pounds of asbestine, 16 pounds of lamp black, 4 gallons of said varnish and 4 gallons of mineral spirits.

4. A new air-drying wrinkling coating composition consisting of 2 gallons of varnish, 1 gallon of raw tung oil, 0.75 gallon of xylol, 0.25 gallon of butanol and 0.125 gallon of a 6% solution of manganese naphthenate, said varnish consisting of a heat reaction product of 100 pounds of rosin-modified phenol formaldehyde resin, 10 gallons of oiticica oil, 2 pounds of litharge, 5 gallons of xylol and 10 gallons of toluol.

5. A new air-drying wrinkling coating composition consisting of 2.25 gallons of varnish, 0.5 gallon of raw tung oil, 0.75 gallon of xylol, 0.25 gallon of butanol and 0.06 gallon of a 6% solution of manganese naphthenate, said varnish consisting of 100 pounds of phenyl phenol formaldehyde resin, 10 gallons of oiticica oil, 2 pounds of red lead, 5 gallons of xylol and 10 gallons of toluol.

6. A new air-drying wrinkling coating composition comprising a cold blend of from 1 to 10 gallons of non-wrinkling varnish and about 1 gallon of raw tung oil, said varnish consisting of the heat reaction product of oil soluble phenol formaldehyde condensation resin, oiticica oil and hardening material selected from the group consisting of litharge and red lead.

7. A new air-drying wrinkling coating composition comprising a cold blend of from 1 to 10 gallons of non-wrinkling varnish and about 1 gallon of raw tung oil, said varnish consisting of the heat reaction product of 100 pounds oil soluble phenol formaldehyde condensation resin, 8 to 12 gallons of oiticica oil, 1 to 3 pounds of hardening material selected from the group consisting of litharge and red lead, and 12 to 20 gallons of thinner.

8. A new air-drying wrinkling coating composition comprising a cold blend of from 1 to 10 gallons of non-wrinkling varnish, about 1 gallon of raw tung oil and a coloring paste, said varnish consisting of the heat reaction product of oil soluble phenol formaldehyde condensation resin, oiticica oil and hardening material selected from the group consisting of litharge and red lead.

9. A new air-drying wrinkling coating composition comprising a cold blend of from 1 to 10 gallons of non-wrinkling varnish, about 1 gallon of raw tung oil and a coloring paste comprising approximately equal amounts of filler and coloring matter and including oiticica oil and thinner, said non-wrinkling varnish consisting of the heat reaction product of oil soluble phenol formaldehyde condensation resin, oiticica oil and hardening material selected from the group consisting of litharge and red lead.

10. A new air-drying wrinkling coating composition comprising a cold blend of from 1 to 10 gallons of non-wrinkling varnish, about 1 gallon of raw tung oil and a coloring paste comprising approximately equal amounts of filler and coloring matter and including said non-wrinkling varnish and thinner, said non-wrinkling varnish consisting of the heat reaction product of oil soluble phenol formaldehyde condensation resin, oiticica oil and hardening material selected from the group consisting of litharge and red lead.

11. A method of preparing an air-drying wrinkle coating composition comprising the steps of heating oil soluble phenol formaldehyde condensation resin and oiticica oil and hardening material selected from the group consisting of litharge and red lead together to form a non-wrinkling varnish, and thereafter cold blending about 1 to 10 gallons of the varnish with about 1 gallon of raw tung oil.

WILLIAM A. WALDIE.

REFERENCES CITED

The following references are of record in the file of this patent:

UNITED STATES PATENTS

| Number | Name | Date |
|---|---|---|
| 1,831,323 | Root | Nov. 10, 1931 |
| 2,069,252 | Kittredge et al. | Feb. 2, 1937 |
| 2,124,703 | Kittredge | July 26, 1938 |
| 2,455,541 | Waldie | Dec. 7, 1948 |

FOREIGN PATENTS

| Number | Country | Date |
|---|---|---|
| 547,321 | Great Britain | Aug. 24, 1942 |

OTHER REFERENCES

The Oil and Colour Trades Journal, July 19, 1935, pages 175 to 177.